(12) United States Patent
Gopal et al.

(10) Patent No.: US 11,431,677 B2
(45) Date of Patent: *Aug. 30, 2022

(54) MECHANISMS FOR LAYER 7 CONTEXT ACCUMULATION FOR ENFORCING LAYER 4, LAYER 7 AND VERB-BASED RULES

(71) Applicant: NICIRA, INC., Palo Alto, CA (US)

(72) Inventors: Sushruth Gopal, Palo Alto, CA (US); Jayant Jain, Palo Alto, CA (US); Subrahmanyam Manuguri, San Jose, CA (US); Anirban Sengupta, Palo Alto, CA (US); Deepa Kalani, Fremont, CA (US); Alok Tiagi, Palo Alto, CA (US); Sushil Singh, Los Altos, CA (US)

(73) Assignee: NICIRA, INC., Palo Alto, CA (US)

( * ) Notice: Subject to any disclaimer, the term of this patent is extended or adjusted under 35 U.S.C. 154(b) by 306 days.

This patent is subject to a terminal disclaimer.

(21) Appl. No.: 15/868,789

(22) Filed: Jan. 11, 2018

(65) Prior Publication Data

US 2019/0215307 A1 Jul. 11, 2019

(51) Int. Cl.
*H04L 9/40* (2022.01)
*G06F 9/455* (2018.01)
(Continued)

(52) U.S. Cl.
CPC ...... *H04L 63/0263* (2013.01); *G06F 9/45533* (2013.01); *G06F 9/45558* (2013.01);
(Continued)

(58) Field of Classification Search
None
See application file for complete search history.

(56) References Cited

U.S. PATENT DOCUMENTS 7,257,833 B1 *  8/2007  Parekh ............... H04L 63/0227
                                                     726/1
7,784,094 B2 *  8/2010  Balakrishnan ....... H04L 43/026
                                                     726/13
(Continued)

OTHER PUBLICATIONS

A. Fiessler, C. Lorenz, S. Hager, B. Scheuermann, A. W. Moore, "HyPaFilter+: Enhanced hybrid packet filtering using hardware assisted classification and header space analysis", IEEE/ACM Trans. Netw., vol. 25, No. 6, pp. 3655-3669, Dec. 2017.*
(Continued)

*Primary Examiner* — Jeffrey Nickerson
*Assistant Examiner* — Vadim Savenkov

(57) ABSTRACT

The method for implementing mechanisms for Layer 7 context accumulation for enforcing Layers 4, 7, and verb-based rules is presented. The method comprises: receiving stream data, and identifying a packet in the stream. If the packet includes Layer 7 headers: for each Layer 7 header: determining content of the packet identified by a Layer 7 header's identifier; and parsing the content to extract firewall input data. If one or more rules at least partially match the firewall input data, determining that a particular rule also includes additional information that cannot be found in the firewall input data; performing a DPI on the content to determine whether at least a portion of the additional information is found in the content; extracting additional input data from the content and adding it to the firewall input data; and applying the rules to the firewall input data to process the packet.

20 Claims, 5 Drawing Sheets

(51) Int. Cl.
*H04L 69/22* (2022.01)
*H04L 69/329* (2022.01)

(52) U.S. Cl.
CPC .......... *H04L 29/06* (2013.01); *H04L 63/0218* (2013.01); *H04L 63/0245* (2013.01); *G06F 2009/45587* (2013.01); *H04L 69/22* (2013.01); *H04L 69/329* (2013.01)

(56) References Cited

U.S. PATENT DOCUMENTS

| | | | | |
|---|---|---|---|---|
| 9,497,089 | B2* | 11/2016 | Zhou | H04L 43/10 |
| 9,923,870 | B2* | 3/2018 | Dusi | H04L 63/0245 |
| 10,291,682 | B1* | 5/2019 | Vishwanathan | H04L 67/02 |
| 10,432,528 | B2* | 10/2019 | Cortes Gomez | H04L 47/11 |
| 2002/0196796 | A1* | 12/2002 | Ambe | H04L 12/4645 |
| | | | | 370/401 |
| 2007/0011734 | A1* | 1/2007 | Balakrishnan | H04L 43/026 |
| | | | | 726/13 |
| 2008/0201772 | A1* | 8/2008 | Mondaeev | H04L 63/1408 |
| | | | | 726/13 |
| 2010/0095367 | A1* | 4/2010 | Narayanaswamy | |
| | | | | H04L 63/0245 |
| | | | | 726/12 |
| 2010/0150104 | A1* | 6/2010 | Yoon | H04W 36/0011 |
| | | | | 370/331 |
| 2012/0240185 | A1* | 9/2012 | Kapoor | H04L 41/0866 |
| | | | | 726/1 |
| 2014/0153435 | A1* | 6/2014 | Rolette | H04L 63/0245 |
| | | | | 370/252 |
| 2016/0070912 | A1* | 3/2016 | Goel | H04L 63/1425 |
| | | | | 726/23 |
| 2016/0173373 | A1* | 6/2016 | Guichard | H04L 45/74 |
| | | | | 370/392 |
| 2017/0005986 | A1* | 1/2017 | Bansal | H04L 63/0263 |
| 2018/0115471 | A1* | 4/2018 | Curcio | H04L 47/31 |
| 2019/0044856 | A1* | 2/2019 | Fischetti | H04L 45/742 |
| 2019/0124010 | A1* | 4/2019 | Murgia | H04L 47/20 |
| 2019/0215306 | A1 | 7/2019 | Gopal | |

OTHER PUBLICATIONS

NSX Distributed Firewall Deep Dive, dated Apr. 30, 2015 roie9876@gmail.com, NSX Distributed Firewall Overview, 58 pages.

Julie Starr, "Getting Started with VMware NSX Distributed Firewall—Part 2", dated Oct. 27, 2015, 14 pages.

Julie Starr, "Getting Started with VMware NSX Distributed Firewall—Part 1", dated Oct. 23, 2015, 2 pages.

Brad Hedlund, "What is a Distributed Firewall?", All Your Packet Are Belong to US dated Jul. 9, 2013, 8 pages.

Fiessler et al., "HyPaFiler+: Enchanted Hybrid Packet Filtering Using Hardware Assisted Classification and Header Space Analysis", IEEE-ACM Trans, vol. 25, No. 6, dated Dec. 2017, pp. 3655-3669.

Gopal, U.S. Appl. No. 15/868,667, filed Jan. 11, 2018, Office Action, dated Oct. 23, 2019.

* cited by examiner

FIG. 3A

310 — Examples of Protocol Identifiers: FTP, TCP, HTTP, HTTP/2

312 — Examples of Protocol Version Identifiers: 1.0, 1.1, 2.0, 3.0

314 — Examples of Action Identifiers: PUT, GET, POST

316 — Examples of Path Identifiers: mywebpage, mywebpage*, *mywebpage*

FIG. 3B

320 — Examples Contexts:

322 — src-addr1, src-port1, dst-addr3, dst-port3, HTTP, http_method = PUT

324 — srcgrp dstgrp TCP FTP ftp_method=put

326 — src-addr1, src-port1, dst-addr3, dst-port3, HTTP, http_method=PUT, path=*mypage*

328 — stream1, GET onewebpage; stream2, POST anotherwebpage

MECHANISMS FOR LAYER 7 CONTEXT ACCUMULATION FOR ENFORCING LAYER 4, LAYER 7 AND VERB-BASED RULES

BACKGROUND

Traditionally, stateful firewalls are initiated by establishing communications connections with rule-repositories, and caching the rules that match the firewalls' criteria. Then, upon receiving data packets, the firewalls parse the received packets and apply the cached rules to the parsed contents of the packets.

Content obtained by parsing a data packet usually includes data extracted from the packet's headers. The content extracted from the headers may include for example, the data that defines a Transmission Control Protocol/Internet Protocol (TCP/IP) connection for communicating the packet. The data from a particular header may include five values, such as a source IP address, a source port number, a destination IP address, a destination port number, and a name of the protocol. The five values are usually referred to as a 5-tuple. The 5-tuple extracted from the data packet is used by a firewall to determine whether the data packet may be transmitted toward its destination.

SUMMARY

Techniques are described herein for implementing a rule processing and enforcement for interleaved Layer 4 (L4), Layer 7 (L7) and verb-based rulesets. The rule processing and enforcement for interleaved L4, L7 and verb-based rulesets may be implemented in a software defined network (SDN). For example, the L4, L7 and verb-based rule processing may be implemented in a firewall that operates on data packets along a data path of the packet communications pipeline. The firewall implementing the L4, L7 and verb-based rules may be encoded as part of emulation code that implements a virtual network interface card that is executed by a hypervisor.

The Layer 4 in the Open Systems Interconnection (OSI) model is a transport layer, while the Layer 7 in the OSI is an application layer. The Layer 4 data included in data packets may include the names of the transport protocols, source identifiers, destination identifiers, and so forth. The Layer 7 data included in the data packets may include the names of the Layer 7 protocols, the Layer 7 verbs, and so forth. The Layer 7 protocol names may include HTTP, FTP, Telnet, NFS, SMTP, and the like. The Layer 7 verbs may include HTTP action verbs, such as GET and POST; FTP commands, such as GET, PUT, and LS; SQL commands, such as SELECT, INSERT, UPDATE, DELETE, CREATE, and DROP; and the like.

Context accumulation for interleaved L4, L7 and verb rulesets may operate on several types of data extracted from data packets. Unlike the typical firewalls, the L4, L7 and verb-based firewall may operate not only on the data extracted from the packets' headers, but also on the data extracted from the packets' payloads. Therefore, the L4, L7 and verb-based firewall takes into account the additional information that other firewalls may omit to consider.

Examples of improvements provided by an L4, L7 and verb-based firewall include a multi-facet filtering of data packets. The filtering is based on the data extracted from not just packets' headers but also from the packets' payloads. The extracted information may include the Layer 4 data, the Layer 7 data, and a mix of the Layer 4 and the Layer 7 data.

The Layer 7 data may be extracted from the packets that are subjected to a Deep Packet Inspection (DPI) analysis.

Depending on the set of rules implemented in an L4, L7 and verb-based firewall and the content of a received data packet, the packet may be subjected to no DPI analysis, a partial DPI analysis, or a full DPI analysis. The scope of the DPI analysis may be determined in an interactive manner and individually for each data packet. For example, upon receiving a data packet, the packet may be initially parsed without performing a DPI analysis. The initially parsed information may be used to determine whether the parsed information, or a portion of the parsed information, matches any rules stored by the firewall. If one or more rules match the parsed information, or a portion of it, then a test is performed to determine whether some of the matching rules also include additional elements that, however, are not included in the initially parsed information. If there are no such rules, then there is no need to perform a DPI because the matching rules include only the initially parsed information or a portion of the initially parsed information. Thus, the processing of such a data packet does not involve a DPI analysis.

However, if one or more rules match the initially parsed information, or a portion of the initially parsed information, but some of the matching rules also include additional information that cannot be found in the initially parsed information, then the received data packet is subjected to a partial DPI or a full DPI analysis. The DPI may be performed on the data packet until the additional information, or a portion of it, is extracted from the received packet. A partial DPI analysis may be performed on the data packet when a particular matching rule includes for example, a name of the Layer 7 protocol, but no other Layer 7-specific information. A full DPI analysis may be performed on the packet when a particular matching rule includes for example, a name of the Layer 7 protocol and the Layer 7 verbs. Generally, a full DPI is performed on the entire data packet to determine that the received packet does include the additional information, or a portion of it, required by the rules, or to determine that the received packet does not include the additional information required by the rules.

Interleaved L4, L7 and verb-based rulesets may include one or more rules, each of which may include rule elements corresponding to data extracted from different headers and different payloads of data packets. For example, a particular rule may include the Layer 4-specific terms, such as src-addr, src-port, dst-addr, and dst-port, as well as the Layer 7-specific terms, such as HTTP, and PUT.

Interleaved L4, L7 and verb-based rulesets may include a mix of the Layer 4 rules, the Layer 7 rules, and the Layers 4 and 7 rules. Furthermore, the rulesets may be structured according to any order of the rules in the rulesets. For example, the Layer 7 rules may be matched with content of a received packet first, and the Layer 4 rules may be matched with the content of the received packet next.

Context accumulation for interleaved L4, L7 and verb-based rulesets may operate on multiple headers extracted from a data packet. Multiple headers may be sent in the packets communicated in compliance with for example, the HTTP/2 protocol. The HTTP/2 enables an efficient use of network resources and a reduced perception of latency by introducing a header field compression, and by allowing multiple concurrent exchanges on the same communications connection. The HTTP/2 allows interleaving request and response messages on the same connection, and uses an efficient coding for HTTP header fields. An L4, L7 and verb-based firewall presented herein allows parsing the multiple HTTP/2 headers in a data packet, identifying contents associated with the individual headers, and applying the L4, L7 and verb-based rules to each content identified by the header's identifier carried in the data packet.

BRIEF DESCRIPTION OF THE DRAWINGS

In the drawings:

FIG. 3A is a block diagram depicting example attributes that may be extracted from data packets;

FIG. 3B is a block diagram depicting example contexts that may be formed from data extracted from data packets;

DETAILED DESCRIPTION

In the following description, for the purposes of explanation, numerous specific details are set forth in order to provide a thorough understanding of the method described herein. It will be apparent, however, that the present approach may be practiced without these specific details. In some instances, well-known structures and devices are shown in a block diagram form to avoid unnecessarily obscuring the present approach.

Figure 1:
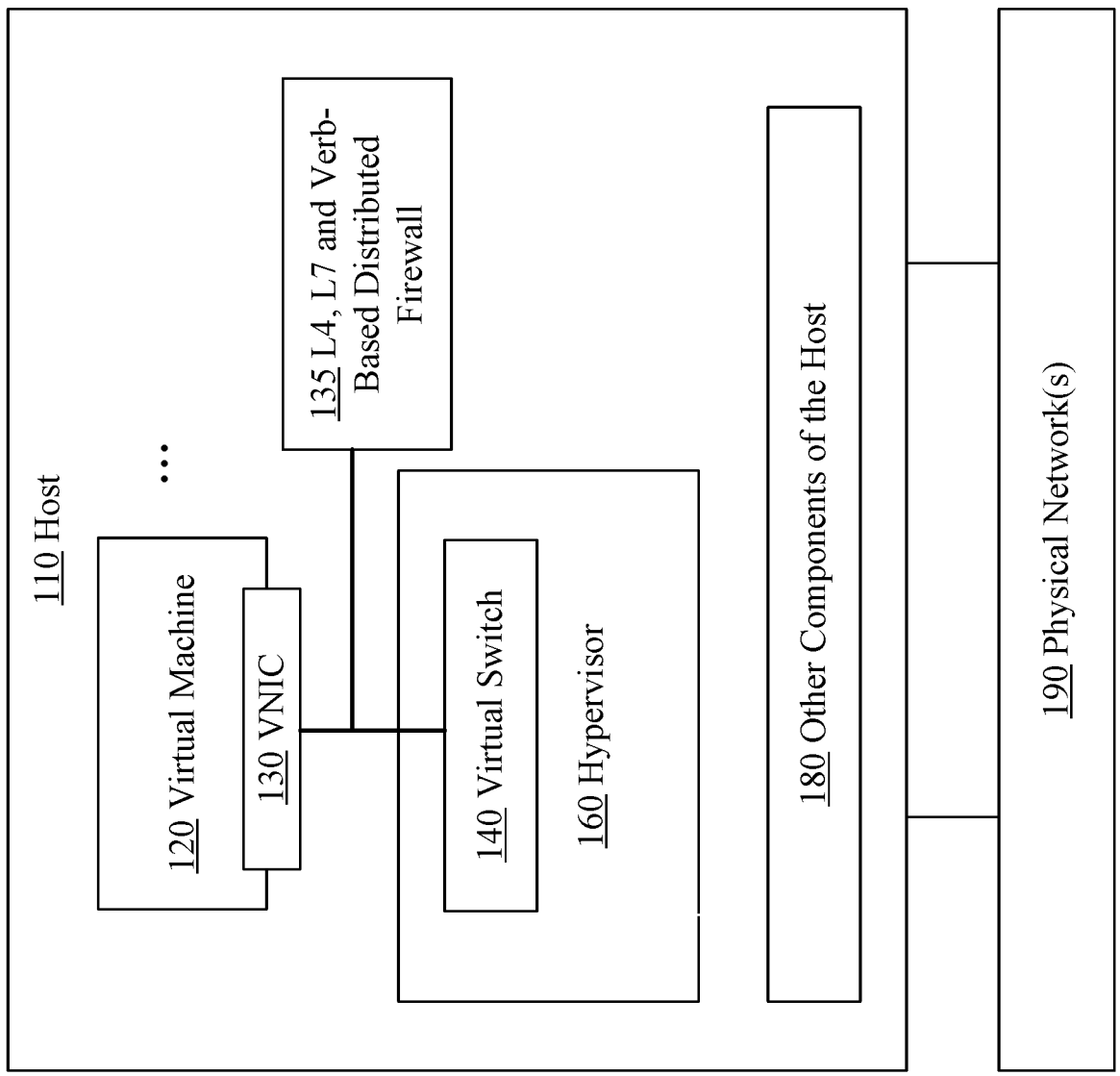
FIG. 1 is a block diagram depicting an example system architecture for implementing an L4, L7 and verb-based firewall.

1. Example System Architecture for Layer 7 Context Accumulation for Enforcing Layer 4, Layer 7 and Verb-Based Rules FIG. 1 is a block diagram depicting an example system architecture for implementing an L4, L7 and verb-based firewall. The depicted system architecture 100 includes one or more hosts 110, and one or more physical networks 190.

Host 110 may include a hypervisor 160, and other components 180, such as hardware components. Hypervisor 160 may include a virtual switch 140, and may provide connectivity to and from one or more virtual machines. Hypervisor 160 may use uplinks to provide connectivity to and from the virtual machines.

Hypervisor 160 may be configured to execute emulation code that implements an L4, L7 and verb-based firewall 135. L4, L7 and verb-based firewall 135 may be part of an SDN at any point along a data path of the packet communications pipeline. L4, L7 and verb-based firewall 135 may be configured to operate not only on the data extracted from the packets' headers, but also on the data extracted from the packets' payloads. The payload data may include the Layer 7 data, and may be extracted once the packets are subjected to a DPI analysis.

Virtual switch 140 may be configured to monitor and manage data traffic that is communicated to and from hypervisor 160. Virtual switch 140 may be implemented as a kernel component of hypervisor 160, or as an entity that is separate from hypervisor 160, but that communicates with hypervisor 160.

Implementations of virtual switch 140 may vary and may depend on a type of product in which the switch is deployed as a virtualization medium. For example, virtual switch 140 may be implemented as part of hypervisor 160, as it is depicted in FIG. 1, and as it is in the vSphere® and KVM® lines of products. Alternatively, although not depicted in FIG. 1, a virtual switch may be implemented as a hardware component, or as part of a user space, or within a privileged virtual machine. Examples of such implementations include the Hyper-V® and Xen® lines of products.

FIG. 1 depicts that host 110 hosts one virtual machine 120. However, host 110 may host as many virtual machines as the configuration of the host allows for.

Virtual machine 120 may be realized as complete computational environments. Virtual machine 120 may contain virtual equivalents of hardware and software components of the physical computing systems. Virtual machine 120 may be instantiated as virtualized computing instances. The instance may be equipped with their own resources, may be assigned their own workloads, and may be configured to perform their own tasks assigned to the workloads. Virtual resources allocated to the virtual machines may include virtual CPUs, virtual memory, virtual disks, virtual network interface controllers and the like. Virtual machine 120 may be configured to execute guest operating systems and guest applications. Virtual machine 120 may use a virtual network interface card VNIC 130 to communicate with hypervisor 160.

A virtualized computing instance may be realized as a hardware virtualization and/or a software virtualization. As a hardware virtualization, the instance may represent for example, an addressable virtual machine. As a software virtualization, the instance may be used to provide for example, an isolated user space instance. Virtualized computing instances may include containers running on a top of host operating systems, virtual private servers, client computers, and hybrid combinations of thereof.

Other components 180 may include hardware processors, memory units, data storage units, and physical network interfaces. Hardware components may include physical network interface controllers (PNICs), that may provide connectivity to routers and switches of physical networks 190.

Physical networks 190 may include local area networks and/or wide area networks, and may utilize various hardware and software configurations. For example, physical networks 190 may include one or more routers, one or more switches, one or more switch ports, and other data communications and processing components.

2. Interleaved Layer 4, Layer 7 and Verb-Based Rulesets

An L4, L7 and verb-based firewall may match the Layer 7 data and Layer 4 data extracted from data packets with the firewall's rules to determine whether the extracted data matches any of the rules. The rulesets may include one or more rules, each of which may include rule elements corresponding to data that could be extracted from different headers and different payloads of data packets. The rules in the ruleset may be ordered in any order. The rules themselves may be include a mix of the Layer 4 rules, the Layer 7 rules, and the Layer 4 and the Layer 7 rules. A ruleset may be structured in such a way that for example, the Layer 4 rules are matched with a received packet first, and the Layer 7 rules are matched with the received packet next. According to another example, another ruleset may be structured in such a way that the Layer 7 rules are matched with the received packet first, and the Layer 4 rules are matched with the received packet next.

The firewall may rely on exact matches and/or partial matches between the rules and contents extracted from data packets. An exact match between the extracted data and a particular rule exists if the extracted data matches the particular rule exactly. For example, if the Layer 4 and Layer 7 data extracted from a data packet includes:

[src-addr1, src-port1, dst-addr3, dst-port3, HTTP, verb=PUT]  (1)

and the L4, L7 and verb-based firewall implements a mixed Layer 4 and Layer 7 rule If [src-addr1, src-port1, dst-addr3, dst-port3, HTTP, http_method=PUT], then PASS  (2)

then, upon comparing extracted data (1) with rule (2), the L4, L7 and verb-based firewall may determine that extracted data (1) matches rule (2) exactly. Upon finding the exact match between extracted data (1) and rule (2), the L4, L7 and verb-based firewall may apply rule (2) to extracted data (1), and determine that the corresponding data packet may be transmitted toward the packet's destination.

An L4, L7 and verb-based firewall may also rely on partial matches between the data extracted from data packets and the firewall's rules. A partial match may include matching regular expressions with expressions containing so called wildcards. For example, if the data extracted from a data packet includes:

[src-addr1, dst-addr3, HTTP, verb=PUT, mywebpage]  (3)

and the L4, L7 and verb-based firewall implements a mixed Layer 4 and Layer 7 rule:

If [src-addr1, dst-addr3, HTTP, http_method=PUT, path=*mywebpage*], then DROP  (4)

then, upon comparing extracted data (3) with rule (4), the L4, L7 and verb-based firewall may determine that extracted data (3) at least partially matches rule (4). Upon finding a partial match between extracted data (3) and rule (4), the L4, L7 and verb-based firewall may apply rule (4) to extracted data (3), and determine that the corresponding data packet cannot be transmitted toward the packet's destination.

An L4, L7 and verb-based firewall may be configured to support the firewall's rules that apply to stream data. However, even though most networking communications use data streams, the Internet transfers are usually in the form of UDP datagrams, TCP segments, and/or IP packets. Therefore, the intercepted data stream may be processed by for example, a stream decoder to identify individual packets, and the identified packets may be directed to the firewall.

An L4, L7 and verb-based firewall may be implemented as a distributed firewall that aims to enforce the firewall's rules while operating in a continuous streaming mode. In the streaming mode, the L4, L7 and verb-based firewall may examine all data flows that the firewall intercepts, examine all data packets that are part of the intercepted flows, and apply the rules on a per-packet basis. Unlike 5-tuple data, which remains constant during the lifetime of a single TCP connection, the Layer 7 verbs included in the packets may change continuously during the lifetime of the single TCP connection. Therefore, in some situations, the L4, L7 and verb-based firewall processes all intercepted packets because the packets that belong to the same data flow may carry different verbs. Thus, the L4, L7 and verb-based firewall may apply different rules to different packets of the same data flow.

3. Firewall Input Data

Figure 2:
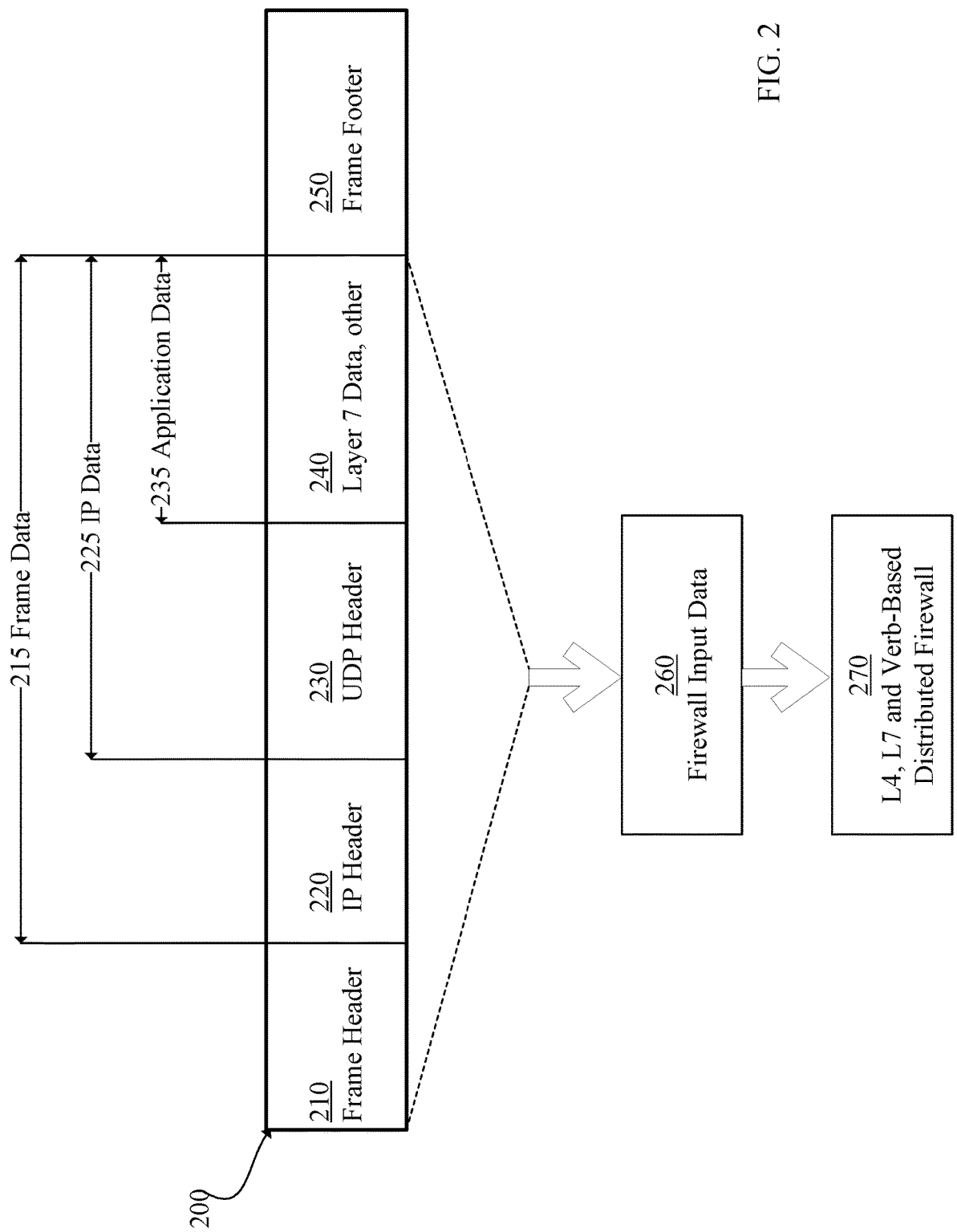
FIG. 2 is a block diagram depicting example firewall input data that may be provided to an L4, L7 and verb-based firewall.

FIG. 2 is a block diagram depicting example firewall input data 260 that may be provided to an L4, L7 and verb-based firewall 270. Firewall input data 260 includes data extracted from a received data packet 200.

Data packet 200 is an example of a typical data packet communicated in a typical computer network. The depicted data packet should not be considered as limiting the presented approach in any way.

Data packet 200 may include a frame header 210, frame data 215, and a frame footer 250. Frame data 215 may include an IP header 220 and IP data 225. IP data 225 may include a UDP header 230 and application data 235. Application data 235 may include the Layer 7 data, such as the Layer 7 protocol names, the Layer 7 verbs, path names, and the like.

Upon receiving data packet 200, the content of the packet is initially parsed to extract certain information from the packet. The initially extracted information may include the Layer 4 data, such as a 5-tuple comprising a source address, a source port, a destination address, a destination port, and a protocol name. The 5-tuple may be used as firewall input data 260, and provided to L4, L7 and verb-based firewall 270.

As L4, L7 and verb-based firewall 270 compares firewall input data 260 to the rules maintained by the firewall, L4, L7 and verb-based firewall 270 may determine that there are some rules that match some of firewall input data 260, but that those rules also include additional elements that are absent in firewall input data 260. To determine whether data packet 200 includes the additional elements, or at least some of the additional elements, L4, L7 and verb-based firewall 270 may subject data packet 200 to a DPI analysis.

4. Partial and Full Deep Packet Inspections

A DPI analysis is a form of data filtering that is used to inspect contents of data packets. The DPI analysis usually includes an analysis of the packets' payloads, such as for example, application data 235 of data packet 200. The DPI is usually more effective than a typical packet filtering that inspects only the packets' headers. Unlike the typical packet filtering, the DPI-based filtering inspects not only the packets' headers, but also the packets' payloads.

A data packet may be subjected to no DPI analysis, a partial DPI analysis, or a full DPI analysis. Determination of the type of the DPI analysis depends on the set of rules implemented in an L4, L7 and verb-based firewall and the content of a received data packet. The scope of the DPI analysis may be determined in an interactive manner and individually for each data packet.

Upon receiving a data packet, the packet may be initially parsed without performing a DPI. The initially parsed information may be used to determine whether the parsed information, or a portion of the parsed information, matches any rules stored by the firewall. If one or more rules match the parsed information, or a portion of it, then a test is performed to determine whether some of the matching rules also include additional elements that are absent in the initially parsed information. If there are no such rules, then there is no need to perform a DPI analysis.

However, if some of the matching rules also include additional information that cannot be found in the initially parsed information, then the received data packet is subjected to either a partial DPI or a full DPI analysis. A partial DPI analysis may be performed on the data packet when a particular matching rule includes for example, a name of the Layer 7 protocol, but no other Layer 7-based information. A full DPI analysis may be performed on the packet when a particular matching rule includes for example, a name of the Layer 7 protocol and the Layer 7 verbs.

For example, L4, L7 and verb-based firewall 270 may subject data packet 200 to a full DPI analysis to extract for example, the Layer 7 verbs from data packet 200, and to include the extracted verbs in firewall input data 260. Suppose that L4, L7 and verb-based firewall 270 implements the following rules:

If [srcgrp1, dstgrp1, TCP FTP, ftp_method=PUT],
   then DROP      (5)

If [srcgrp1, dstgrp1, TCP FTP], then PASS      (6)

then, L4, L7 and verb-based firewall 270 may perform a DPI analysis on data packet 200 to determine whether data packet 200 includes the verb "PUT." If, upon performing the DPI analysis on data packet 200, it is determined that data packet 200 does include srcgrp1, dstgrp1, TCP, FTP, and the verb "PUT," then rule (5) is applied, and data packet 200 may be dropped.

However, if it is determined that data packet 200 does not include the verb "PUT," but includes the srcgrp1, dstgrp1, TCP, and FTP, then rule (6) is applied to firewall input data 260, and L4, L7 and verb-based firewall 270 may allow data packet 200 to be transmitted toward the packet's destination.

5. Example Attributes Extracted From Data Packets

FIG. 3A is a block diagram depicting example attributes that may be extracted from data packets. An attribute in the context of an L4, L7 and verb-based firewall is a characteristic or value that may be extracted from a data packet. Attributes may be extracted from any headers and/or payloads of the received data packets, and may include the Layer 4 data, the Layer 7 data, and the like.

Attributes may be divided into groups based on their types. For example, the attributes that are specific to the names of data communications protocols may be grouped in a group called the protocol identifiers, whereas the attributes that are specific to the protocol versions may be grouped in a group called the protocol version identifiers.

The examples depicted in FIG. 3A are provided to merely illustrate one way of grouping the attributes extracted from data packets. The attributes in FIG. 3A have been grouped based on the attributes' types. The example groups include protocol identifiers 310, protocol version identifiers 312, action identifiers 314, and path identifiers 316.

Examples of protocol identifiers 310 may include names of the data communications protocols, such as FTP, TP, HTTP, HTTP/2, and so forth. Examples of protocol version identifiers 312 may include numerical versions, such as 1.0, 1.1, 2.0 3.0, and so forth. Examples of action identifiers 314 may include verbs, such as PUT, GET, POST, and so forth. Examples of path identifiers 316 may include path names represented using alphanumerical strings, and may include one or more wildcards, such as "*." Examples of the paths may include mywebpage, mywebpage*, and *mywebpage*. Other groups and other types of attributes may also be identified.

The attributes extracted from data packets may be used to generate contexts for the packets. The context may include the attributes such as a name of the communications protocol used to communicate the data packet, a version of the communications protocol, an action identifier, and the like. The context may be used to generate firewall input data that an L4, L7 and verb-based firewall may use to determine whether the packet is to be transmitted toward its destination.

6. Example Contexts

In the field of data packet processing, context is a set of properties that define the attribute-based environment for a data packet. The context may include attributes or properties that are extracted from the data packet. Some attributes may be extracted from the portion of the packet that is sent in clear; other attributes may be extracted after the packet is decrypted and a DPI analysis is performed on the packet. Depending on the L4, L7 and verb ruleset and the content of the data packet, the packet may be subjected to no DPI analysis, a full DPI analysis, or a partial DPI analysis to determine attributes for the data packet. The set of attributes derived from the data packet is referred to herein as the context for the data packet.

FIG. 3B is a block diagram depicting example contexts 320 that may be derived from data extracted from data packets. Example contexts 320 depicted in FIG. 3B include an example 322, an example, 324, an example 326, and an example 328.

Example 322 is an example context determined for a first hypothetical data packet, and includes the following attributes derived by applying a DPI analysis to the packet:

src-addr1, src-port1, dst-addr3, dst-port3, HTTP,
   http_method=PUT      (7)

wherein src-addr1 denotes a source address, src-port1 denotes a source port, dst-addr3 denotes a destination address, dst-port3 denotes a destination port, HTTP denotes a name of the communications protocol extracted from one of the headers of the first hypothetical data packet; and http_method=PUT denotes an action "PUT."

Example 324 is an example context determined for a second hypothetical data packet, and includes the following attributes derived by applying a DPI analysis to the packet:

srcgrp dstgrp TCP FTP ftp_method=put      (8)

wherein srcgrp denotes a source group identifier, dstgrp denotes a destination identifier, TCP denotes a name of the communications protocol extracted from one of the headers of the second hypothetical data packet, FTP denotes a name of the communications protocol extracted from another header of the second hypothetical data packet, and ftp_method=put denotes an FTP action "put."

Example 326 is an example context determined for a third hypothetical data packet, and includes the following attributes derived by applying a DPI analysis to the packet:

src-addr1, src-port1, dst-addr3, dst-port3, HTTP,
   http_method=PUT, path=*mypage*      (9)

wherein src-addr1 denotes a source address, src-port1 denotes a source port, dst-addr3 denotes a destination address, dst-port3 denotes a destination port, HTTP denotes a name of the communications protocol extracted from one of the headers of the third hypothetical data packet; and http_method=PUT denotes an action "PUT," and path=*mywebpage* denotes any path that includes a string mywebpage. The path is expressed as *mywebpage* using two wildcards, where one wildcard is before the word mywebpage, and another wildcard is after the word mywebpage. Therefore, any path that includes the word mywebpage will be considered a valid path in the third hypothetical example.

Example 328 describes two contexts determined for a fourth hypothetical data packet, and includes the following attributes derived by applying a DPI analysis to the packet:

stream1, GET onewebpage; stream2, POST another-
   webpage      (10)

wherein stream1 denotes a first data stream identifier extracted from a first header of the fourth hypothetical data packet, GET denotes an action get, onewebpage denotes a path extracted from the first header of the fourth hypothetical data packet, stream2 denotes a second data stream identifier extracted from a second header of the fourth hypothetical data packet, POST denotes an action post, anotherwebpage denotes a path extracted from the second header of the fourth hypothetical data packet.

The attributes in example 328 were extracted from the fourth hypothetical data packet that, most likely, included a communication transmitted in compliance with the HTTP/2 protocol. Therefore, the fourth hypothetical data packet had two headers: one of them included the following attributes: stream1, GET, onewebpage; while the other included the following attributes: stream2, POST anotherwebpage.

The contexts extracted from data packets may be used to form firewall input data, which in turn may be used by an L4, L7 and verb-based firewall to monitor and control incoming and outgoing network traffic.

7. Example Processing of Data Packets Having Multiple Headers

In case of data packets communicated in compliance with for example, the HTTP/2 protocol, a single data packet may carry multiple headers. Therefore, multiple contexts may be obtained from an HTTP/2 packet. In the HTTP/2, a request/response pair is mapped onto a stream, and each stream is given a unique identifier. The streams are initiated by a headers frame from a client, or a push promise frame from a server.

The HTTP/2 frames may include stream identifiers in the header. A stream identifier allows an endpoint to determine the stream to which the request belongs to. By default, there is no limit on the number of concurrent streams that can be active within a communications connection. However, a server may impose a limit using a setting frame to limit the amount of server resources that a single client may consume.

A binary framing layer in the HTTP/2 enables a full request/response multiplexing. This may be enabled by allowing a client and a server to break down an HTTP message into independent frames, interleave them, and then reassemble them at the receiving end. Since a single packet carrying the HTTP/2 content may include not just one, but multiple headers, the single HTTP/2 packet may carry multiple Layer 7 data, such as the Layer 7 protocol names, and the Layer 7 verbs.

For example, a single packet may have two stream identifiers: one of them may include:

HTTP_METHOD=GET and
    HTTP_PATH=*mywebpage.com* (11)

while another may include:

HTTP_METHOD=POST and
    HTTP_PATH=*mywebpage.com* (12)

In this case, an L4, L7 and verb-based firewall would parse the data packet to generate two separate attribute sets. Each of the separate attribute sets may be used to determine a separate Layer 7 context. An L4, L7 and verb-based firewall may perform a rule lookup for each of the Layer 7 contexts.

Figure 4:
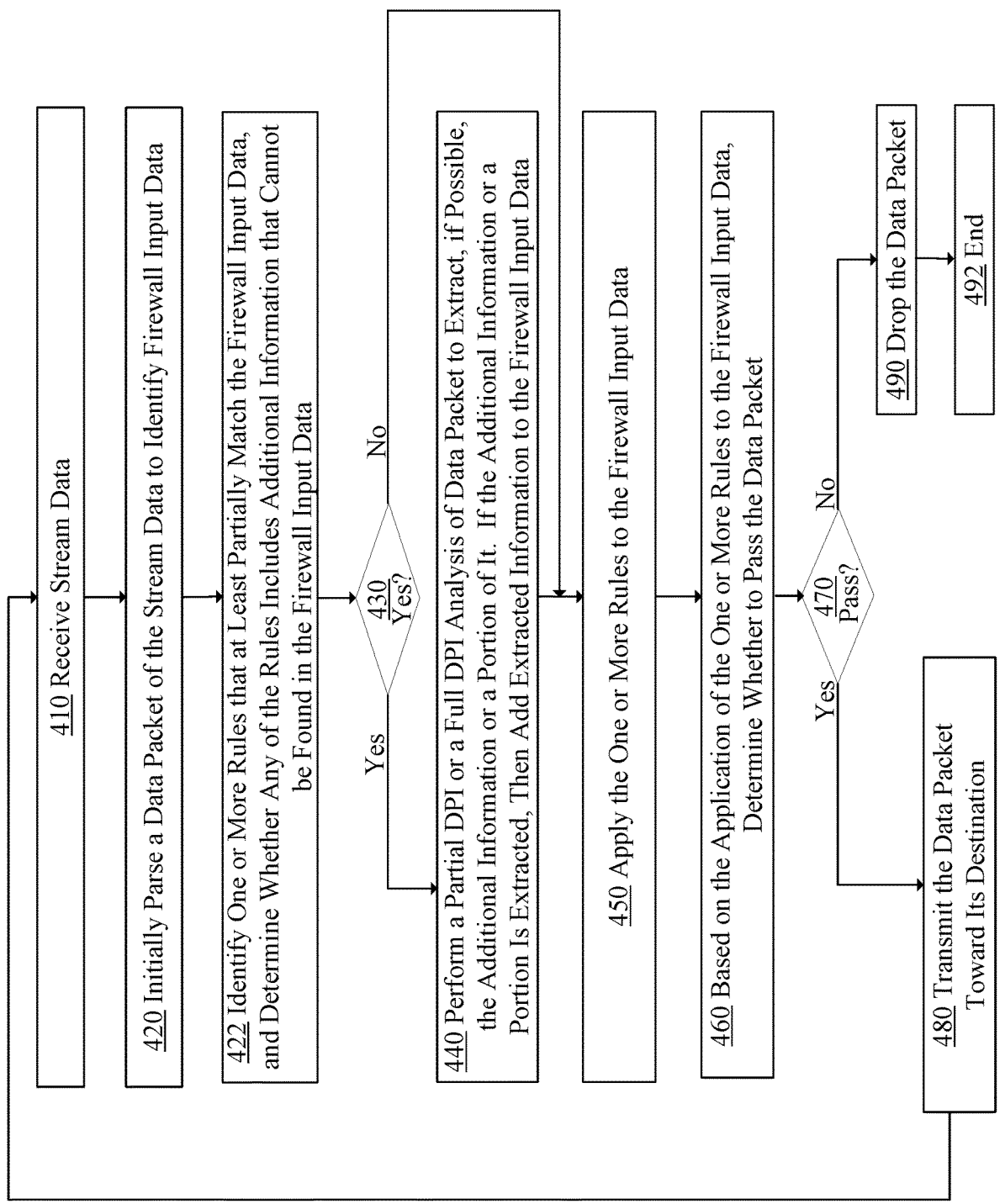
FIG. 4 depicts an example flow chart for implementing an L4, L7 and verb-based firewall.

8. Layer 7 Context Accumulation for Enforcing Layer 4, Layer 7 and Verb-Based Rules FIG. 4 depicts an example flow chart for implementing an L4, L7 and verb-based firewall. In step 410, stream data is received. The stream data may be decoded to identify individual data packets, and the data packets may be provided to the firewall.

In step 420, a data packet of the stream data is initially parsed to identify firewall input data. The firewall input data may include any combination of data initially extracted from data packets. The initially extracted data may include the data that was sent in clear in the packet data. The initially extracted data may include a 5-tuple that may include a source address, a destination address, a source port, a destination port, and a protocol name.

In step 422, one or more firewall rules that at least partially match the firewall input data are identified. The one or more rules may be identified by comparing the elements included in the rules with the content of the firewall input data. If no rule that at least partially matches the firewall input data can be identified, then the data packet is transmitted toward its destination, and either another data packet of the data stream is parsed in step 420, or a new stream data is received in step 410.

However, if in step 422, the one or more firewall rules that at least partially match the firewall input data are identified, then the contents of the rules are compared with the firewall input data to determine whether any of the rules includes additional information that cannot be found in the firewall input data initially extracted from the data packet.

In step 430, a test is performed to determine whether any of the rules that at least partially match the firewall input data include additional information that cannot be found in the firewall input data. If the outcome of the test is positive, then step 440 is performed. Otherwise, step 450 is performed.

In step 440, a partial DPI analysis and/or a full DPI analysis on the data packet is performed to determine whether the data packet includes the additional information, or portion of it, that is included in the matching rules, but that was not found in the initially parsed information.

The DPI analysis may be performed incrementally until the additional information, or a portion of it, is found in the data packet, or until it is determined that the data packet does not include the additional information. For example, if it is determined that a particular matching rule includes not only a 5-tuple, but also the Layer 7 protocol data and the Layer 7 verbs, then the data packet is subjected to the DPI analysis until the Layer 7 protocol data and verbs are found, or until the entire data packet is parsed but not additional information is found. The Layer 7 verbs may include HTTP action verbs, such as GET and POST; FTP commands, such as GET, PUT, and LS; SQL commands, such as SELECT, INSERT, UPDATE, DELETE, CREATE, and DROP; and the like.

If the particular matching rule includes for example, a name of the Layer 7 protocol, but no other Layer 7 information, then to determine whether the data packet includes the name of the Layer 7 protocol, the data packet may be subjected to a partial DPI analysis.

However, if the particular matching rule includes for example, a name of the Layer 7 protocol and the Layer 7 verbs, then to determine whether the data packet includes the name of the Layer 7 protocol and the Layer 7 verbs, the data packet may be subjected to a full DPI analysis.

Performing a DPI analysis on a packet includes providing the packet to a DPI engine. The DPI engine may perform a deep packet inspection on the data packet to determine whether the packet includes the additional information that is included in the one or more matching rules, but that was not found in the firewall input data obtained by the initial parsing of the packet.

If, in the course of performing the DPI analysis on the data packet, it is determined that the data packet includes the additional information or a portion of the additional information, then the corresponding information is extracted from the data packet and added to the firewall input data. The corresponding information may match the additional information, or a portion of the additional information, that is included in the one or more matching rules, but that was not found in the initially parsed information.

However, if, in the course of performing the DPI analysis on the data packet, it is determined that the data packet does not include any portion of the additional information that is included in the one or more matching rules, then no data is added to the firewall input data.

In step 450, the one or more rules are applied to the firewall input data. The rules may be applied sequentially to the firewall input data until it is unequivocally determined whether the data packet may be transmitted toward its destination or not.

Application of the one or more rules to the firewall input data may include creating the context for the data packet using the firewall input data, and determining whether the context matches at least partially the elements included in the rules. The context may include one or more of: the 5-tuple data, the Layer 7 protocol name, the Layer 7 verbs, or other application layer data.

In step 460, based on the application of the one or more rules to the firewall input data, it is determined whether the data packet is to be transmitted toward its destination. For example, suppose that particular firewall input data includes [src-addr1, dst-addr1], and suppose that a particular L4, L7 and verb-based firewall rule states that if [src-addr1 dst-addr1] are included in the firewall input data, then the corresponding data packet is to be dropped. In this case, the particular firewall input data matches the particular rule. Therefore, the particular rule will apply to the particular firewall input data, and the data packet will be dropped.

In step 470, a test is performed to determine, based on application of the one or more rules to the firewall input data, whether to pass the data packet toward its destination. If it is determined that the data packet is to be passed toward its destination, then step 480 is performed. Otherwise, step 490 is performed.

Step 480 is performed when it is determined, based on applying the one or more rules to the firewall input data, that the corresponding data packet is to be transmitted toward its destination. Subsequently, the data packet is transmitted toward its destination, and the L4, L7 and verb-based firewall proceeds to performing step 410, described above.

Step 490 is performed when it is determined, based on applying the one or more rules to the firewall input data, that the corresponding data packet is to be dropped. Therefore, in step 490, the data packet is dropped, and the further processing of the stream data ends. Furthermore, the stream is reset by sending a TCP reset packet if the TCP protocol is used to communicate the stream, or by sending an ICMP port unreachable datagram if the UDP protocol is used to communicated the stream.

The process described in FIG. 4 implements an L4, L7 and verb-based firewall that operates on any combination of the Layer 4 data and the Layer 7 data extracted from data packets. Some data is extracted from the portions of the packets that are sent in clear in the packets. Other data may be extracted from the data packets by subjecting the packets to a DPI analysis.

9. Example Rules Implemented in an L4, L7 and Verb-Based Firewall

Figure 5:
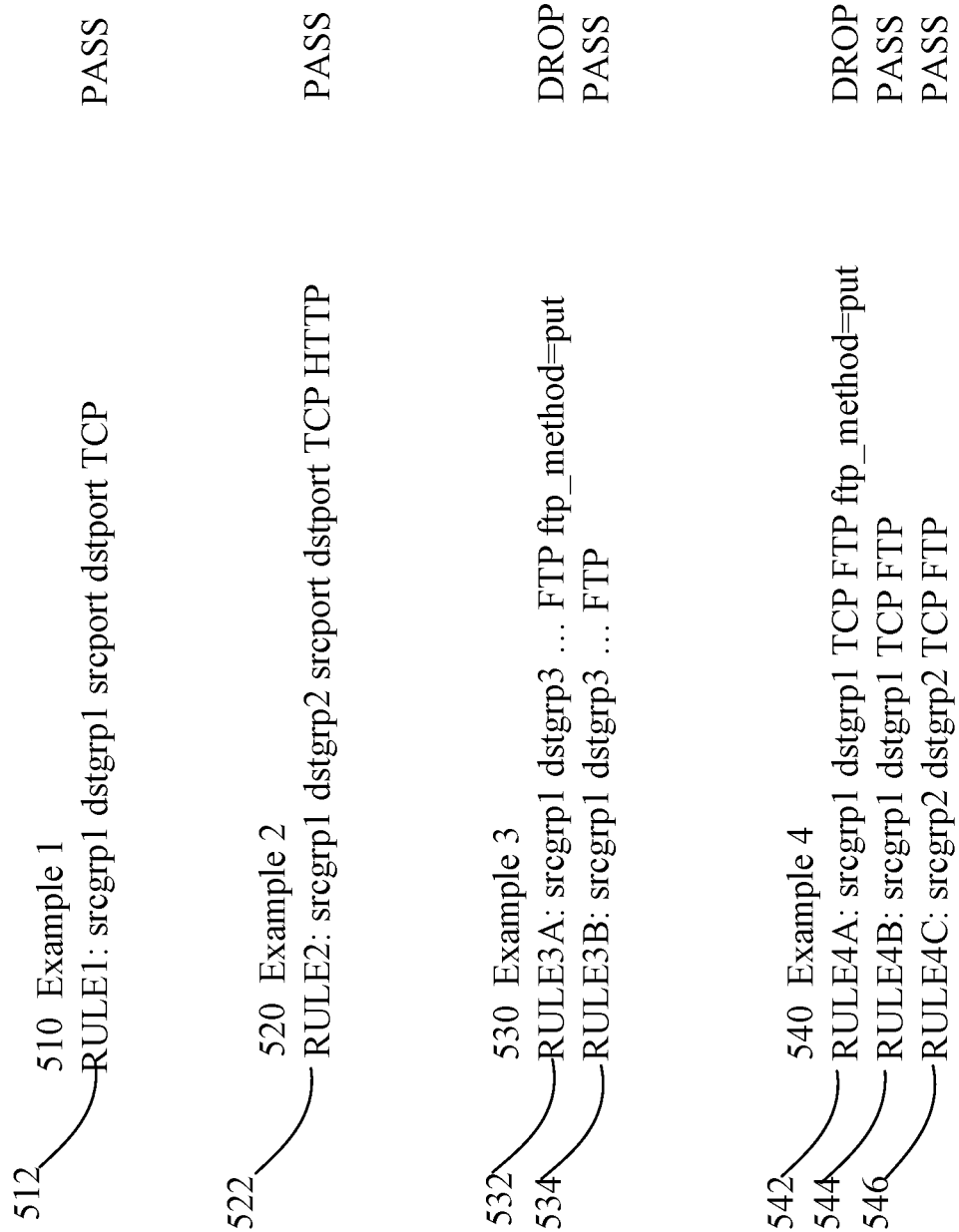
FIG. 5 depicts example rules implemented in an L4, L7 and verb-based firewall.

FIG. 5 depicts example rules that may be implemented in an L4, L7 and verb-based firewall. The depicted examples include a first example 510, a second example 520, a third example 530, and a fourth example 540. The depicted examples should not be considered as limiting the disclosure in any way.

First example 510 is provided to explain that applying some rules to data packets may require no DPI analysis. Such rules may include the rule elements that may be matched with attributes that are extracted from the data packets without subjecting the data packets to the DPI analysis.

First example 510 includes the following rule:

RULE1: srcgrp1 dstgrp1 srcport dstport TCP PASS    (13)

wherein srcgrp1 denotes a source group identifier, dstgrp1 denotes a destination group identifier, srcport denotes a source port, dstport denotes a destination port, TCP denotes the TCP communications protocol, and PASS means that if firewall input data includes all the attributes [srcgrp1, dstgrp1, srcport, dstport, TCP], then the corresponding data packet may be transmitted toward its destination.

A DPI analysis is not required in this example because all the attributes: srcgrp1, dstgrp1, srcport, dstport, and TCP may be extracted from a data packet without subjecting the data packet to the DPI. Therefore, upon receiving a data packet, the data packet may be parsed to extract a source address, a destination address, a source port, a destination port, and the TCP name from the packet header that is sent in clear. If the extracted information matches the attributes [srcgrp1, dstgrp1, srcport, dstport, TCP], then the condition set forth in RULE1 (13) is satisfied, and the data packet is transmitted toward its destination. The disposition of the packet is made without subjecting the data packet to the DPI because all attributes that need to be matched with all elements included in RULE1 (13) were extracted from the packet without performing the DPI.

However, an application of some rules to data packets may require a DPI analysis of the data packets. The scope of performing the DPI may, however, depend on the rules. To apply some of such rules, the DPI may be required to identify only a Layer 7 protocol, as in second example 520, described below. To apply other rules, however, the data packets may be continuously subjected to the DPI, as in third example 530, below.

Second example 520 includes the following rule:

RULE2: srcgrp1 dstgrp2 srcport dstport TCP HTTP
    PASS    (14)

wherein srcgrp1 denotes a source group identifier, dstgrp2 denotes a destination group identifier, srcport denotes a source port, dstport denotes a destination port, TCP denotes the TCP communications protocol, HTTP denotes the HTTP communications protocol, and PASS means that if firewall input data includes all the attributes [srcgrp1, dstgrp2, srcport, dstport, TCP, HTTP], then the corresponding data packet may be transmitted toward its destination.

A DPI analysis is required here because, while the attributes [srcgrp1, dstgrp2, srcport, dstport, TCP] may be extracted from a data packet without subjecting the data packet to the DPI, determining whether the data packet includes the HTTP attribute may require performing the DPI analysis on the packet. Therefore, upon receiving a data packet, the data packet may be parsed to extract a source address, a destination address, a source port, a destination port, and a name of the TCP communications protocol from the packet header that is sent in clear. Then, the data packet may be subjected to the DPI analysis to determine whether the packet includes the word HTTP.

Hence, RULE2 (14) is a rule example that may be applied to packets that were subjected to the DPI to only determine whether the data packet includes a Layer 4 protocol name.

Third example 530 includes the following two rules:

RULE3A: srcgrp1 dstgrp3 . . . FTP ftp_method=put
    DROP    (15)

RULE3B: srcgrp1 dstgrp3 . . . FTP PASS (16)

wherein srcgrp1 denotes a source group identifier, dstgrp3 denotes a destination group identifier, FTP denotes the FTP communications protocol, ftp-method=put denotes the ftp action PUT, DROP means that if firewall input data includes the attributes [srcgrp1, dstgrp3, FTP, ftp_method=put], then the corresponding data packet is to be dropped, and PASS means that if firewall input data includes the attributes [srcgrp1, dstgrp3, FTP], then the corresponding data packet may be transmitted toward its destination.

A continuous DPI analysis is required here because while the attributes [srcgrp1, dstgrp2] may be extracted from a data packet without subjecting the data packet to the DPI, the attribute ftp-method attribute may not be extracted from the data packet without performing the DPI on the data packet.

In fact, the DPI analysis needs to be performed continuously on all data packets that belong to the same data flow as the packet in third example 530 because the ftp_method attribute may change from packet-to-packet. Therefore, upon receiving a data packet of a particular data flow, the data packet may be parsed to extract a source address, a destination address, and so forth, as that information is sent in the data packet in clear. However, determining whether the firewall input data includes the ftp_method=put attribute, the DPI needs to be performed on each and every data packet in the particular data flow. Hence, RULE3A (15) and RULE3B (16) are examples of the rules that may be applied if the data packets are subjected to a continuous DPI analysis.

Fourth example 540 includes the following three rules:

RULE4A: srcgrp1 dstgrp1 TCP FTP ftp_method=put
DROP (17)

RULE4B: srcgrp1 dstgrp1 TCP FTP PASS (18)

RULE4C: srcgrp2 dstgrp2 TCP FTP PASS (19)

Fourth example 540 is provided to explain that sending all data packets communicated along all communications connections to the DPI engine to match the verb-based rules might be time-consuming and expensive. Therefore, an L4, L7 and verb-based firewall may be configured to send only the data packets communicated via certain connections to the verb based rule processing. To determine which connections are the required connections, the L4, L7 and verb-based firewall may implement a mechanism that triggers the continuous verb discovery mode on a per-connection-basis during the rule lookup.

Based on RULES (17)-(19), the initial FTP packets that are exchanged between srcgrp1 and dstgrp1 are allowed based on RULE4B (18). However, if the data packet includes an FTP PUT, then RULE4A (17) is applied, and such a data packet will be dropped.

Furthermore, if the data packets are communicated via an FTP connection between srcgrp2 and dstgrp2, then the data packets will be subjected to RULE4C (19), and such data packets will be transmitted toward their respective destinations regardless of the verbs included in the packets. Therefore, the data packets that include srcgrp2 and dstgrp2 do not require a continuous DPI analysis.

To simplify the application of rules such RULES (17)-(19), the concepts of a potential match and an exact match are employed. For example, if the 6-tuple extracted from a data packet matches a particular rule that includes [src addr, dst addr, src port, dst port, protocol, application protocol], then the particular rule is referred to as a potential match.

However, if not only the 6-tuple, but also the verbs extracted from a data packet match the particular rule, then the particular rule is considered an exact match.

Furthermore, if there are any verb-based rules of lower priority that are potential matches, then the respective connection between the src addr and the dst addr should be kept in a perpetual discovery mode, and the rule evaluation should be performed for every Layer 7 context. This mechanism allows the L4, L7 and verb-based firewall to perform the verb-based rule processing of only those data packets that are communicated along the required connections. This allows the L4, L7 and verb-based firewall to execute the verb-based filtering of the data packets efficiently and in an expedited manner.

10. Improvements Provided by Certain Embodiments

The approach presented herein improves a firewall-based network security system by implementing an L4, L7 and verb-based firewall that can operate on any combination of the Layer 4 data and the Layer 7 data. The Layer 4 data may include the 5-tuples extracted from data packets. The Layer 7 data may include the Layer 7 protocol names and the Layer 7 verbs. The L4, L7 and verb-based firewall may use any type of mixed rules that include elements from any header and/or from any payload included in the data packets.

Context accumulation for interleaved L4, L7 and verb-based rulesets described herein operates on any combination of data extracted from data packets. Some data, such as 5-tuples, is extracted from the portion of a packet that is sent in clear in the packet. Other data is extracted once the packet is processed by a DPI engine. The scope of the DPI analysis may be determined in an interactive manner and individually for each data packet.

Context accumulation for interleaved L4, L7 and verb-based rulesets uses rules to control incoming and outgoing network traffic by applying the rules to not only 5-tuples, but also to the Layer 7 data extracted from data packets. The 5-tuple information and Layer 7 data provides context for determining the rules that may be applicable to the extracted data. The rules are applied to determine whether the corresponding data packet is to be transmitted toward its destination.

By considering not only 5-tuple information, but also Layer 7 protocol data extracted from data packets, an L4, L7 and verb-based firewall provides a strong network security system for monitoring and controlling incoming and outgoing network traffic. The barrier that the L4, L7 and verb-based firewall establishes between a trusted network and an untrusted network is stronger and more robust than a barrier established by a typical firewall because the L4, L7 and verb-based barrier takes into account the data that other firewalls omit to consider.

11. Implementation Mechanisms

The present approach may be implemented using a computing system comprising one or more processors and memory. The one or more processors and memory may be provided by one or more hardware machines. A hardware machine includes a communications bus or other communication mechanisms for addressing main memory and for transferring data between and among the various components of hardware machine. The hardware machine also includes one or more processors coupled with the bus for processing information. The processor may be a microprocessor, a system on a chip (SoC), or other type of hardware processor.

Main memory may be a random-access memory (RAM) or other dynamic storage device. It may be coupled to a communications bus, and used for storing information and software instructions to be executed by a processor. Main memory may also be used for storing temporary variables or other intermediate information during execution of software instructions to be executed by one or more processors.

12. General Considerations

Although some of various drawings may illustrate a number of logical stages in a particular order, stages that are not order dependent may be reordered and other stages may be combined or broken out. While some reordering or other groupings may be specifically mentioned, others will be obvious to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described regarding specific embodiments. However, the illustrative embodiments above are not intended to be exhaustive or to limit the scope of the claims to the precise forms disclosed. Many modifications and variations are possible in view of the above teachings. The embodiments were chosen to best explain the principles underlying the claims and their practical applications, to thereby enable others skilled in the art to best use the embodiments with various modifications as are suited to the uses contemplated.

In the foregoing specification, embodiments of the approach have been described with reference to numerous specific details that may vary from implementation to implementation. The specification and drawings are, accordingly, to be regarded in an illustrative rather than a restrictive sense. The sole and exclusive indicator of the scope of the approach, and what is intended by the applicants to be the scope of the approach, is the literal and equivalent scope of the set of claims that issue from this application, in the specific form in which such claims issue, including any subsequent correction.

Any definitions set forth herein for terms contained in the claims may govern the meaning of such terms as used in the claims. No limitation, element, property, feature, advantage or attribute that is not expressly recited in a claim should limit the scope of the claim in any way. The specification and drawings are to be regarded in an illustrative rather than a restrictive sense.

As used herein the terms "include" and "comprise" (and variations of those terms, such as "including," "includes," "comprising," "comprises," "comprised" and the like) are intended to be inclusive and are not intended to exclude further features, components, integers or steps.

References in this document to "an embodiment," indicate that the embodiment described or illustrated may include a particular feature, structure, or characteristic, but every embodiment may not necessarily include the particular feature, structure, or characteristic. Such phrases are not necessarily referring to the same embodiment. Further, when a particular feature, structure, or characteristic is described or illustrated in connection with an embodiment, it is believed to be within the knowledge of one skilled in the art to affect such feature, structure, or characteristic in connection with other embodiments whether or not explicitly indicated.

Various features of the disclosure have been described using process steps. The functionality/processing of a given process step could potentially be performed in different ways and by different systems or system modules. Furthermore, a given process step could be divided into multiple steps and/or multiple steps could be combined into a single step. Furthermore, the order of the steps can be changed without departing from the scope of the present disclosure.

It will be understood that the embodiments disclosed and defined in this specification extend to alternative combinations of the individual features and components mentioned or evident from the text or drawings. These different combinations constitute various alternative aspects of the embodiments.

What is claimed is:

1. A method for a hypervisor to implement mechanisms for Layer 7 context accumulation for enforcing Layer 4, Layer 7, and verb-based rules, the method comprising:
    receiving stream data intercepted along a data path;
    identifying a data packet in the stream data;
    parsing the data packet to determine whether the data packet includes a plurality of Layer 7 headers;
    in response to determining that the data packet includes the plurality of Layer 7 headers:
        for each Layer 7 header of the plurality of Layer 7 headers:
            determining content of the data packet that is identified by an identifier included in a Layer 7 header;
            parsing the content to extract firewall input data from the content;
            determining whether one or more rules at least partially match the firewall input data, wherein each of the elements comprises a value to be compared with a corresponding value associated with the data packet and wherein a partial match occurs when at least a subset of the elements matches the corresponding values of the firewall input data;
        in response to determining that the one or more rules include elements that at least partially match the firewall input data:
            determining that a particular rule, of the one or more partially matched rules, includes additional information elements that require additional information that is not included in the firewall input data;
            based on determining that the particular rule includes additional elements that require additional information that is not included in the firewall input data, selecting to perform a deep packet inspection (DPI) on the content to determine whether additional information obtained from the DPI matches the additional elements; and
            in response to determining that the firewall input data along with the additional information satisfies all elements included in the particular rule, performing an action associated with the particular rule on the data packet, wherein the action is one of: a drop action or a pass action, wherein the pass action causes transmitting the data packet toward a destination of the data packet.

2. The method of claim 1, wherein the firewall input data includes Layer 4 data and Layer 7 data;
    wherein the Layer 4 data and the Layer 7 data is used to generate context data for determining whether the one or more rules apply to the firewall input data;
    wherein the Layer 4 data includes one or more of: a source address, a source port, a destination address, a destination port, or a protocol identifier;
    wherein the Layer 7 data includes one or more of: a Layer 7 protocol name, or one or more Layer 7 verbs; and
    wherein the one or more Layer 7 verbs include one or more of: HTTP action verbs, FTP commands, or SQL commands.

3. The method of claim 1, wherein the data packet that includes the plurality of Layer 7 headers is transmitted in compliance with an HTTP/2 protocol.

4. The method of claim 1, wherein the particular rule, of the one or more rules that at least partially match the firewall input data, includes one or more of: Layer 4-specific data, Layer 7-specific data, or Layer 4-7-specific data.

5. The method of claim 1, wherein performing the DPI on the content to determine whether at least the portion of the additional information is found in the content comprises: performing a full DPI to determine whether at least a second portion of the additional information is found in the content.

6. The method of claim 5, wherein the full DPI is performed by a DPI engine; and
wherein performing the full DPI comprises generating a decrypted content by decrypting the content, analyzing Layer 7 data included in the decrypted content, and extracting Layer 7 data from the decrypted content; and
wherein performing the full DPI comprises analyzing all fields of the decrypted content.

7. The method of claim 1, wherein parsing the content to extract firewall input data from the content is performed without DPI.

8. One or more non-transitory computer-readable storage media storing one or more computer instructions which, when executed by one or more processors, cause the one or more processors to perform:
receiving stream data intercepted along a data path;
identifying a data packet in the stream data;
parsing the data packet to determine whether the data packet includes a plurality of Layer 7 headers;
in response to determining that the data packet includes the plurality of Layer 7 headers:
for each Layer 7 header of the plurality of Layer 7 headers:
determining content of the data packet that is identified by an identifier included in a Layer 7 header;
parsing the content to extract firewall input data from the content;
determining whether one or more rules include elements that at least partially match the firewall input data, wherein each of the elements comprises a value to be compared with a corresponding value associated with the data packet and wherein a partial match occurs when at least a subset of the elements matches the corresponding values of the firewall input data;
in response to determining that the one or more rules include elements that at least partially match the firewall input data:
determining that a particular rule, of the one or more partially matched rules, includes additional elements that require additional information that is not included in the firewall input data;
based on determining that the particular rule includes additional elements that require additional information that is not included in the firewall input data, choosing to perform a deep packet inspection (DPI) on the content to determine whether additional information obtained from the DPI matches the additional elements; and
in response to determining that the firewall input data along with the additional information satisfies all elements included in the particular rule, performing an action associated with the particular rule on the data packet, wherein the action is one of: a drop action or a pass action, wherein the pass action causes transmitting the data packet toward a destination of the data packet.

9. The one or more non-transitory computer-readable storage media of claim 8,
wherein the firewall input data includes Layer 4 data and Layer 7 data;
wherein the Layer 4 data and the Layer 7 data is used to generate context data for determining whether the one or more rules apply to the firewall input data;
wherein the Layer 4 data includes one or more of: a source address, a source port, a destination address, a destination port, or a protocol identifier;
wherein the Layer 7 data includes one or more of: a Layer 7 protocol name, or one or more Layer 7 verbs; and
wherein the one or more Layer 7 verbs include one or more of: HTTP action verbs, FTP commands, or SQL commands.

10. The one or more non-transitory computer-readable storage media of claim 8, wherein the data packet that includes the plurality of Layer 7 headers is transmitted in compliance with an HTTP/2 protocol.

11. The one or more non-transitory computer-readable storage media of claim 8, wherein the particular rule, of the one or more rules that at least partially match the firewall input data, includes one or more of: Layer 4-specific data, Layer 7-specific data, or Layer 4-7-specific data.

12. The one or more non-transitory computer-readable storage media of claim 8, storing additional instructions which, when executed by the one or more processors, cause the one or more processors to perform: performing a full DPI to determine whether at least a portion of the additional information is found in the content t.

13. The one or more non-transitory computer-readable storage media of claim 12,
wherein the full DPI are performed by a DPI engine; and
wherein performing the full DPI comprises generating a decrypted content by decrypting the content, analyzing Layer 7 data included in the decrypted content, and extracting Layer 7 data from the decrypted content; and
wherein performing the full DPI comprises analyzing all fields of the decrypted content.

14. The one or more non-transitory computer-readable storage media of claim 12, storing additional instructions which, when executed by the one or more processors, cause the one or more processors to perform: applying the one or more rules to the firewall input data to determine a processing of the content of the data packet.

15. A hypervisor implemented in a host computer and configured to implement mechanisms for Layer 7 context accumulation for enforcing Layer 4, Layer 7, and verb-based rules, the hypervisor comprising:
one or more processors;
one or more memory units; and
one or more non-transitory computer-readable storage media storing one or more computer instructions which, when executed by the one or more processors, cause the one or more processors to perform:
receiving stream data intercepted along a data path;
identifying a data packet in the stream data;
parsing the data packet to determine whether the data packet includes a plurality of Layer 7 headers;
in response to determining that the data packet includes the plurality of Layer 7 headers;
for each Layer 7 header of the plurality of Layer 7 headers:
determining content of the data packet that is identified by an identifier included in a Layer 7 header:

parsing the content to extract firewall input data from the content;

determining whether one or more rules include elements that at least partially match the firewall input data, wherein each of the elements comprises a value to be compared with a corresponding value associated with the data packet and wherein a partial match occurs when at least a subset of the elements matches the corresponding values of the firewall input data;

in response to determining that the one or more rules include elements that at least partially match the firewall input data:

determining that a particular rule, of the one or more partially matched rules, includes additional elements that require additional information that is not included in the firewall input data;

based on determining that the particular rule includes additional elements that require additional information that is not included in the firewall input data, choosing to perform a deep packet inspection (DPI) on the content to determine whether additional information obtained from the DPI matches the additional elements; and in response to determining that the firewall input data along with the additional information satisfies all elements included in the particular rule, performing an action associated with the particular rule on the data packet, wherein the action is one of: a drop action or a pass action, wherein the pass action causes transmitting the data packet toward a destination of the data packet.

16. The hypervisor of claim 15, wherein the firewall input data includes Layer 4 data and Layer 7 data;

wherein the Layer 4 data and the Layer 7 data is used to generate context data for determining whether the one or more rules apply to the firewall input data;

wherein the Layer 4 data includes one or more of: a source address, a source port, a destination address, a destination port, or a protocol identifier;

wherein the Layer 7 data includes one or more of: a Layer 7 protocol name, or one or more Layer 7 verbs; and wherein the one or more Layer 7 verbs include one or more of: HTTP action verbs, FTP commands, or SQL commands.

17. The hypervisor of claim 15, wherein the data packet that includes the plurality of Layer 7 headers is transmitted in compliance with an HTTP/2 protocol.

18. The hypervisor of claim 15, wherein the particular rule, of the one or more rules that at least partially match the firewall input data, includes one or more of: Layer 4-specific data, Layer 7-specific data, or Layer 4-7-specific data.

19. The hypervisor of claim 15, wherein the one or more non-transitory computer-readable storage media store additional instructions which, when executed by the one or more processors, cause the one or more processors to perform:

performing a full DPI to determine whether at least a second portion of the additional information is found in the content.

20. The hypervisor of claim 19, wherein the full DPI is performed by a DPI engine; and wherein performing the full DPI comprises generating a decrypted content by decrypting the content, analyzing Layer 7 data included in the decrypted content, and extracting Layer 7 data from the decrypted content; and wherein performing the full DPI comprises analyzing all fields of the decrypted content.

* * * * *